Ya# United States Patent
Mitchell et al.

[15] 3,652,316
[45] Mar. 28, 1972

[54] HEAT-SEALABLE HYDROXYETHYL CELLULOSE FILM AND PROCESS FOR PREPARING SAME

[72] Inventors: Reid L. Mitchell; Charles F. Murphy, both of Morristown; Edmund M. La Polla, Parsippany, all of N.J.

[73] Assignee: ITT Rayonier Incorporated, New York, N.Y.

[22] Filed: Jan. 23, 1969

[21] Appl. No.: 793,551

[52] U.S. Cl. ..............................117/73, 99/171 S, 117/47 A, 117/68, 117/76 F, 117/122 H, 117/145, 117/161 UH, 260/17 R
[51] Int. Cl. ........................................B32b 23/08, C09j 7/02
[58] Field of Search..................117/76 F, 73, 161 UH, 145, 117/122 H, 47 A

[56] References Cited

UNITED STATES PATENTS

| | | | |
|---|---|---|---|
| 2,650,172 | 8/1953 | Brillhart | 117/76 F |
| 3,242,002 | 3/1966 | Brader | 117/76 F |
| 3,316,120 | 4/1967 | Vitalis et al. | 117/76 F |
| 3,409,460 | 11/1968 | Mitchell et al. | 117/145 X |
| 3,423,350 | 1/1969 | Ryan | 117/76 F X |
| 3,447,948 | 6/1969 | Koch | 117/76 F X |
| 3,513,055 | 5/1970 | Brader et al. | 117/76 F X |

FOREIGN PATENTS OR APPLICATIONS

| | | | |
|---|---|---|---|
| 224,957 | 5/1958 | Australia | 117/76 F |

*Primary Examiner*—William D. Martin
*Assistant Examiner*—Ralph Husack
*Attorney*—C. Cornell Remsen, Jr., Walter J. Baum, Paul W. Hemminger, Charles L. Johnson, Jr., James B. Roden, Delbert P. Warner and Marvin M. Chabon

[57] ABSTRACT

When hydroxyethyl cellulose (HEC) films are treated with a solution of a hydrophobic film former such as polyvinylidene chloride copolymers or nitrocellulose in a volatile solvent to produce a heat sealable coating on the surface of the film, the adhesion between the HEC and the hydrophobic film former is improved by passing the HEC gel film through a conditioning bath containing from about 0.3 to 2.0 percent by weight (based on total bath weight) of a water soluble block copolymer of polyoxyethylene and polyoxypropylene prior to drying the film and applying hydrophobic film former solution thereto.

11 Claims, No Drawings

HEAT-SEALABLE HYDROXYETHYL CELLULOSE FILM AND PROCESS FOR PREPARING SAME

BACKGROUND OF THE INVENTION

1. Field of the Invention

This invention relates to cellulosic films having a coating of heat-sealable hydrophobic material on the surface thereof, and more particularly to hydroxyethyl cellulose film coated with copolymers of vinylidene chloride with other monomers, or with nitrocellulose and the like.

2. Prior Art

Flexible, transparent, cellulose-base films such as cellophane and hydroxyethyl cellulose (HEC) are somewhat sensitive to water and permeable to water vapor. Accordingly, in applications where these properties are detrimental it is customary to coat said films with microthin layers of transparent, hydrophobic film formers such as Saran-type vinylidene and vinyl chloride copolymers or cellulose nitrate. Coated films of this type have been highly successful and are being produced in large quantities. Water barrier coated HEC films have a slight edge in appearance, stability and shelf life over coated cellophane films. However, in packaging applications involving crimped or heated end-seals such as those used in packaging peas, beans, rice and other commodities for display and sale, an unexpected coating adhesion problem has thus far kept coated HEC films from being competitive with coated cellophane films.

When a commodity such as rice is packaged in a bag formed from two facing layers of hydrophobic resin-coated cellulose-base film having a face-to-face heat seal at the sides and ends of the bag, the retention of the rice in the bag depends upon the strength and integrity of the heat seal. When the bag is shaken, the rice impacts against the bottom seal, bending the two films at the seal in a "Y" or "T" fashion, thereby tending to split the seal open. Repeated impacts should generally wedge the films apart, the gradual separation of the two films occurring in the very thin resin coating on the surface of the films. Eventually the gradual peeling apart of the two films will allow the contents of the package to escape through the thus opened seal. However, the eventual opening of the end seal should occur only as a result of the peeling apart of the resin coatings and only after the filled bag has been subjected to far more impacts than it would receive in normal use.

A serious problem arises when face-to-face heat seals of Saran or nitrocellulose coated HEC films are subjected to the kind of impact and wedging apart just described. That is to say, the heat seal fails suddenly and unexpectedly when subjected to relatively low stresses, the HEC-base films tearing at the seal rather than the resin coating thereon gradually peeling apart. Microscopic observation of the failures indicates a topochemical unevenness in adhesion of the coating to the base film (probably coupled with an improper balance between the strength of coating to coating adhesion and coating to base-film adhesion). Strain on the seal results in irregular and spotty release of the coating from the base-film which subjects said base-films to magnified stress in localized areas. This magnified stress in turn causes the sudden and unpredictable failures (usually sawtooth type tears near the leading edge of the seal) under relatively low stress conditions. Such phenomena do not occur when using a coated cellophane film under equivalent conditions.

SUMMARY OF THE INVENTION

The present invention comprises the discovery that the foregoing problem can be solved, and that the performance of coated HEC film with respect to face-to-face end-seals be improved to where it is equal to or even superior to that of an equivalent coated cellophane film, by treating the HEC gel film with a conditioning bath containing from about 0.3 to about 2.0 per cent (based on bath weight) of a water-soluble block copolymer of polyoxyethylene and polyoxypropylene prior to coating the dry HEC film with the desired hydrophobic film former. Suitable block copolymers are sold under the trade name of Pluronic by Wyandotte Chemicals Corporation, and these block copolymers are advantageously added to the anchoring and/or softener baths during the casting of the HEC base film. This simple gel film conditioning treatment in the course of an otherwise conventional casting procedure improves the heat seal performance of the subsequently coated film to the point where the tendency to suddenly rupture or tear under stress is substantially entirely eliminated. Even when the stress is sufficiently strong to overcome the adhesion of the seal, the seal will peel open slowly without sudden failure. The improvement also is achieved without detrimental effect on the appearance, water vapor barrier, or dimensional stability properties of the HEC sheet.

DETAILED DESCRIPTION

Hydroxyethyl cellulose film is manufactured by continuously casting a thin, relatively wide stream of a caustic solution of HEC into an acidic coagulating bath which immediately neutralizes the caustic solution and coagulates a thin gel film of HEC that is continuously removed from the coagulating bath for further treatment. A typical HEC casting solution may contain about 9.0 per cent HEC and 5.6 per cent by weight NaOH, and a typical coagulating bath may contain from about 10 to 14 per cent by weight $H_2SO_4$ and from about 12 to 24 per cent by weight $Na_2SO_4$.

The HEC gel film removed from the coagulating bath is washed with water to remove residual acid and salts therefrom, and the washed film is moved through one or more conditioning baths which contain film softening and coating anchoring agents. Typical film softening agents include, but are not limited to, glycerol, triethylene glycol and mixtures of urea and ethylene glycol, the amount of such softeners present in the conditioning bath ranging from about 1 to 10 per cent by weight of the bath. Typical coating anchoring agents include, but are not limited to, melamine formaldehyde, polyethylene imine and modified urea formaldehyde, the amount of said anchoring agent present in the bath ranging from about 0.05 to 0.5 per cent by weight of the bath. The softening and anchoring agents may be incorporated in the same conditioning bath or in separate baths.

The treated film is dried and the dry film is then dipped in or sprayed with a solution of hydrophobic film former or coating material in a volatile organic solvent. The lacquer coated film is then heated to evaporate the solvent for the coating material and to obtain the desired coated HEC film product. The hydrophobic coating material advantageously is nitrocellulose or one of the family of copolymers of vinylidene chloride and vinyl chloride, acrylonitrile or methyl metha-crylate sold under the trade name SARAN by the Dow Chemical Company. The volatile solvent advantageously but not necessarily is tetrahydrofuran, and the coating lacquer advantageously comprises 10 per cent solids and 90 per cent solvent.

In accordance with the practice of our invention the HEC gel film is treated with a conditioning bath containing from about 0.3 to 2.0 per cent by weight (based on the total bath weight) of a water-soluble nonionic block copolymer of polyoxyethylene and polyoxypropylene. These block copolymers are prepared by adding ethylene oxide to both ends of a hydrophobic polyoxypropylene nucleus having a molecular weight varying from 800 to many thousands, the hydrophilic ethylene oxide groups added to the nucleus constituting from about 10 per cent to 80 per cent of the final molecule. The simplified structure of these block copolymers can be represented as

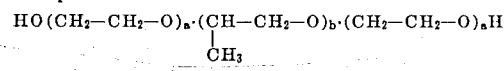

in which $a$ and $b$ have average values for particular copolymers of 9 and 21; 8.5 and 30; 13 and 30; 20 and 30; 25.5 and 39; and 80 and 30, respectively. The values of $a$ may vary within a range dependent on the total molecular weight of the copolymer and the value of $b$ and the value of $b$ may vary within a range dependent on the total molecular weight of the copolymer and the value of *a*.

Various such block copolymers may be used such as those having average molecular weights ranging from about 1,000 to over 10,000 (preferably 2,000–9,000) and containing from 10–80 per cent by weight of polyoxyethylene (preferably 30–80 per cent). These block copolymers, for example, are manufactured and sold under the trade name "PLURONIC" by Wyandotte Chemicals Corporation and may be used according to the present invention. A wide range of Pluronic block copolymers have successfully been used in the practice of our invention. These Pluronics include the following:

| Pluronic | Average Molecular Weight | Polyoxyethylene Wt. % (Approx.) |
|---|---|---|
| L–44 | 2000 | 40 |
| L–63 | 2500 | 30 |
| L–64 | 2900 | 40 |
| P–65 | 3500 | 50 |
| P–85 | 4500 | 50 |
| F–68 | 8750 | 80 |

Note: All of the above are water-soluble liquids (L), pastes (P) or flakes (F).

The water-soluble block copolymer is added to a conditioning bath through which the washed HEC gel film is moved prior to drying of the treated film. The block copolymer can be incorporated in a separate conditioning bath or in a conditioning bath that also contains softening agents and/or anchoring agents as previously described. After treatment with such a conditioning bath the film will contain from about 0.5 to about 5.0 per cent by weight (based on the dry weight of the film) of a block copolymer of polyoxyethylene and polyoxypropylene incorporated in the film at the surface thereof. The dry block copolymer-containing film is then lacquer coated with a hydrophobic film former (e.g., Saran) in the manner previously described. The incorporation of a block copolymer in the surface of the HEC film corrects localized adhesion failure when the Saran-coated film is heat sealed in the usual manner. The reason for the effectiveness of the block copolymer as a corrective for localized adhesion failure is not known. The block copolymer may act as a selective pinpoint plasticizer or as a surface modifier with properties that give far better uniformity of contact points in the seal. It may insure more uniform softener distribution or anchor agent distribution, or it may have an unknown beneficial action inherent in the material which increases the multiplicity of effective adhesion sites between the coating and the base sheet. In any case the strength and uniformity of heat sealed coating adhesion is dramatically improved.

The following examples are illustrative but not limitative of the practice of our invention.

EXAMPLE I

Hydroxyethyl cellulose (HEC) solution containing 9.0% HEC and 5.6% NaOH (by weight) was machine cast into a bath containing 12% $H_2SO_4$ and 18% $Na_2SO_4$ at 40° C. The gel film was led through a series of wash-water tanks to remove residual acid and salt, and then into a final bath containing 5.0% glycerine as a film softener and 0.10% Accobond 3,900, (manufactured by American Cyanamid Co.), a melamine-formaldehyde pre-condensate employed herein as an anchoring agent. After passing through an enclosed series of steam heated dryer rolls, the dried film was collected as a control. Without interrupting the machine operations, liquid Pluronic L–64 was added to the softener/anchoring bath in amount equivalent to 1.0 percent of the bath weight, and a test roll of Pluronic-treated film was collected. The dried control film was 0.00095 inch thick and contained 18 percent glycerine. The test film was 0.00097 inch thick and contained 18 percent glycerine plus 1.7 percent Pluronic L–64.

Both films were coated with a polyvinylidene chloride copolymer lacquer containing 3 parts by weight Saran F–216 resin, 1 part Saran F–220 resin, (both of these products are copolymers of at least 80 percent vinylidene chloride with other monomers such as vinyl chloride, methyl methacrylate, acrylonitrile and the like; and are manufactured by Dow Chemical Co.), 0.1 percent behenic acid and 0.3 percent Abril "E" wax based on total solids; all dissolved in tetrahydrofuran to form a 10 percent solids/90 percent solvent lacquer. The resulting coating was 0.00007 inch thick on each side of the HEC base film.

Pairs of coated film strips one inch wide and 8 inches long were heat-sealed at one end by using a heated-jaw sealing machine at 275° F. and 20 p.s.i. jaw pressure for 3 seconds. The free end of one strip was clamped in a spring balance with a maximum range of 1,000 grams, and the free end of the other strip was pulled downward by hand at a rate of about 12 inches/min. The force which tended to peel open the seal was at the same time indicated on the spring scale.

The sealed control strips without Pluronic treatment consistently tore along the seal boundary at an indicated force of 150 to 200 grams/lineal inch. The sealed Pluronic-treated strips peeled apart under a force of 400 to 500 grams/lineal inch without any tearing of the HEC film.

EXAMPLE II

Coated films were prepared as in Example I, except that 1 percent Carbowax 9000, a polyethylene oxide product, was substituted for 1 percent Pluronic L–64 as a treatment for the test film. When sealed strips were peeled apart as in Example I, the untreated control film consistently failed by tearing along the seal boundary at an indicated force of 150 to 200 grams per inch. The Carbowax treated control film also failed by tearing along the seal boundary at an indicated force of 100 to 200 grams per lineal inch, showing no improvement in the desired peeling action or reduction of tearing tendency due to the Carbowax treatment.

EXAMPLE III

Coated films were prepared as in Example I with and without 1 percent Pluronic L–64 added to the softener/anchoring bath prior to drying, coating and sealing. Bags were made from folded single sheets of film. The bags were 7 inches long by 4 inches wide and were heat-sealed along the side and across the full bottom width. The bottom seal measured 4 inches by 1 inch. Bags were made from the HEC control coated and Pluronic L–64 treated films, and from commercial coated cellophane samples A and B.

The bags were partly filled with 100 grams of rice, then grasped at the top to close the bag, while leaving an empty space above the rice charge.

To test the effectiveness of the heat seal, the partly filled bag was shaken with sharp downward strokes. Each stroke was made in such fashion that the rice impinged against the inside of the bottom seal in a manner tending to wedge open or peel apart the seal.

Bags made from the control HEC films without Pluronic L–64 treatment consistently failed after one or two shakes by the film tearing along the inside seal boundary. HEC bags made from films treated with 1 percent Pluronic L–64 survived 15 to 25 shake cycles and the seal gradually peeled open under the successive impacts without film tearing. Bags made from commercial coated cellophane (A) and (B) survived, respectively, 10 to 20 shakes, with occasional film tearing, and 15 to 25 shakes with seal opening, but no film tearing.

EXAMPLE IV

Coated film samples were prepared with and without Pluronic L–64 as in Example 1, but in addition the softener/anchoring bath was emptied, cleaned and refilled with the standard solution containing 5 percent glycerine and 0.1 percent Accobond 3900; and to this was added sufficient Pluronic P–85 to bring its concentration to 1 percent of the total bath weight. Thus, HEC films were prepared comprising a control of standard manufacture, another treated with 1 percent Pluronic L-64 and a third treated with 1 percent Pluronic P-85. Heat-sealed bags were prepared as in Example III, from the above films and commercially coated cellophane Samples (A) and (B). Each bag was filled with 200 grams of rice, then heat sealed again at the top to completely close the bags.

Sets of five sealed bags of each film type were packed snugly in separate cardboard mailing boxes; then each box was dropped from a height of 4 feet onto the floor. The boxes were opened and the condition of the bags inspected after each drop.

Bags treated with Pluronic L-64 performed comparably to those of the better commercial cellophane, as seen in the Table below. Pluronic P-85 treatment performed less effectively, but still much better than the untreated HEC control, which consistently failed on the first drop.

TABLE I

| Film | Softener/anchoring bath treatment | Survival per set of 5 bags | | |
|---|---|---|---|---|
| | | 1st drop | 2d drop | 3d drop |
| 1. HEC | Standard control (no pluronic) | 0 | 0 | 0 |
| 2. HEC | 1% Pluronic L-64 added | 5 | 5 | 4 |
| 3. HEC | 1% Pluronic P-85 added | 3 | 2 | 2 |
| 4. Coated cellophane | Commercial A | 5 | 5 | 4 |
| 5. Coated cellophane | Commercial B | 4 | 4 | 3 |
| 6. Lab viscose cellophane | With 1.0% L-64 | 5 | 4 | 3 |
| 7. Lab viscose cellophane | Without L-64 | 4 | 3 | 3 |

EXAMPLE V

Coated films were prepared as in Example I, except that, after washing, the wet gel film was led into a final bath containing 3.0 percent urea and 2.0 percent ethylene glycol as combined film softeners, and 0.10 percent Accobond 3900 as an anchoring agent. A control film was dried and collected, and, without interrupting film production, liquid Pluronic L-64 was added to the softener/anchoring bath in an amount equivalent to 1.0 percent of the bath weight. A test roll of Pluronic-treated film was collected.

The dried control film was 0.00096 inches thick and contained 11 percent urea and 7.5 percent ethylene glycol. The test film was 0.00099 inches thick and contained 11 percent urea, 7 percent ethylene glycol and 1.6 percent Pluronic L-64. After coating and sealing the film samples were tested as in Example I. The sealed control strips without Pluronic treatment consistently tore along the seal boundary at an indicated force of 100 to 150 grams/lineal inch. The sealed Pluronic-treated strips peeled apart under a force of 200 to 300 grams/lineal inch without any tearing of the HEC film.

EXAMPLE VI

HEC base film was cast as described in Example I and the washed gel film was treated with a softener bath containing varying amounts of Pluronic L-64 ranging from 0 to 3 per cent by weight of the bath. The treated film was then coated with Saran, and the coated film was heat sealed and tested with the following results:

TABLE II

| Softener % Glycerol | Bath Pluronic % L-64 | Dry Film Softener % Glycerol | Pluronic % L-64 | saran coated seal pull test grams/lineal inch | |
|---|---|---|---|---|---|
| | | | | Tear | Peel |
| 5.2 | 0 | 20 | 0 | 150 | |
| 5.2 | 0.1 | 20 | 0.2 | 150 | |
| 5.2 | 0.3 | 20 | 0.5 | | 300 |
| 5.2 | 0.5 | 20 | 0.9 | | 400 |
| 5.2 | 1.0 | 20 | 1.7 | | 500 |
| 5.2 | 1.5 | 20 | 2.2 | | 550 |
| 5.2 | 2.0 | 20 | 3.0 | | 400 |
| 5.2 | 3.0 | 20 | 4.3 | | 200 |

EXAMPLE VII

HEC base film was cast as described in Example I and the washed film was treated with a bath containing 5.5 percent by weight glycerine and 0.1 percent by weight Accobond as film softeners and coating anchoring agents, respectively. The bath also contained 1.0 percent by weight of one of several representative Pluronics. The treated film was then dried and coated with Saran as previously described, and samples of the coated film were heat sealed with a jaw pressure of 80 p.s.i. The heat sealed films were then pull tested with the following results:

TABLE III

| Bath Pluronic | Saran Coated Seal Peel Test Grams/lineal inch |
|---|---|
| 1.0% L-44 | 580 |
| 1.0% L-63 | 460 |
| 1.0% L-64 | 560 |
| 1.0% P-65 | 420 |
| 1.0% F-68 | 200* |
| 1.0% P-85 | 420 |

*20 P.S.I. seal

We claim:

1. In the process for preparing a hydroxyethyl cellulose film having a heat-sealable coating of a hydrophobic resin on the surface thereof wherein a washed hydroxyethyl cellulose film is coated with a hydrophobic resin, the improvement which comprises treating the washed hydroxyethyl cellulose film with a conditioning bath containing from about 0.3 to about 2 percent by weight, based on total bath weight, of a nonionic block copolymer of polyoxyethylene and polyoxypropylene, drying the film and coating said film with said hydrophobic resin, said block copolymer comprising between about 10 and 80 percent by weight polyoxyethylene and between about 90 and 20 percent by weight polyoxypropylene.

2. The process according to claim 1 in which the hydrophobic resin is selected from the group consisting of copolymers of vinylidene chloride and vinyl chloride, vinylidene chloride and acrylonitrile, and vinylidene chloride and methyl methacrylate.

3. The process according to claim 1 in which the hydrophobic resin is nitrocellulose.

4. The process according to claim 1 in which the conditioning bath also contains a softener for the hydroxyethyl cellulose film.

5. The process according to claim 1 in which the conditioning bath also contains an anchoring agent for the hydrophobic resin coating.

6. The process according to claim 1 in which the block copolymer of polyoxyethylene and polyoxypropylene has an average molecular weight of between about 1,000 and 10,000.

7. The process according to claim 1 in which the block copolymer of polyoxyethylene and polyoxypropylene has an average molecular weight of between about 2000 and 9000 and comprises between about 30 and 80 percent by weight polyoxyethylene.

8. Hydroxyethyl cellulose film having from about 0.5 to about 5.0 percent by weight, based on the dry weight of the film, of a block copolymer of polyoxyethylene and polyoxypropylene incorporated in the film at the surface thereof, said block copolymer comprising between about 10 and 80 percent by weight polyoxyethylene and between about 90 and 20 percent by weight polyoxypropylene.

9. The hydroxyethyl cellulose film of claim 8 wherein the block copolymer of polyoxyethylene and polyoxypropylene has an average molecular weight of between about 1000 and 10,000.

10. The hydroxyethyl cellulose film of claim 8 wherein the block copolymer of polyoxyethylene and polyoxypropylene has an average molecular weight of between about 2000 and 9000 and comprises between about 30 and 80 percent by weight polyoxyethylene.

11. The hydroxyethyl cellulose film of claim 8 wherein a heat-sealable coating of a hydrophobic resin has been applied over the block copolymer.

* * * * *